United States Patent [19]

Shipman

[11] E Re. 29,712

[45] Reissued Aug. 1, 1978

[54] DOUBLE CYLINDER LOCK BOLT ASSEMBLY

[76] Inventor: Paul Shipman, 3835 Ridgeley Dr., Los Angeles, Calif. 90008

[21] Appl. No.: 781,930

[22] Filed: Mar. 28, 1977

Related U.S. Patent Documents

Reissue of:

[64] Patent No.: 3,964,281
Issued: Jun. 22, 1976
Appl. No.: 562,631
Filed: Mar. 27, 1975

[51] Int. Cl.[2] ..... E05B 63/14

[52] U.S. Cl. ..... 70/120; 70/156

[58] Field of Search ..... 70/120, 156, 134, 144, 70/99, 100, 380, DIG. 60

[56] References Cited

U.S. PATENT DOCUMENTS

| | | | |
|---|---|---|---|
| 750,285 | 1/1904 | Johnson | 70/120 |
| 1,189,991 | 7/1916 | Mugler | 70/120 |
| 2,772,554 | 12/1956 | Schacht | 70/120 |
| 2,920,474 | 1/1960 | Johns | 70/120 |
| 3,086,383 | 4/1963 | Scott | 70/156 |
| 3,670,537 | 6/1972 | Horgan | 70/120 |
| 3,759,074 | 9/1973 | Prahl | 70/156 |

*Primary Examiner*—Robert A, Hafer
*Attorney, Agent, or Firm*—Howard L. Johnson

[57] ABSTRACT

Double cylinder door lock which operates a ceiling- and/or floor-socketed lock bolt which can be added to inner face of already hanging door. Either or both operating cylinders can be key-operated pin tumblers.

14 Claims, 4 Drawing Figures

FIG. 1.
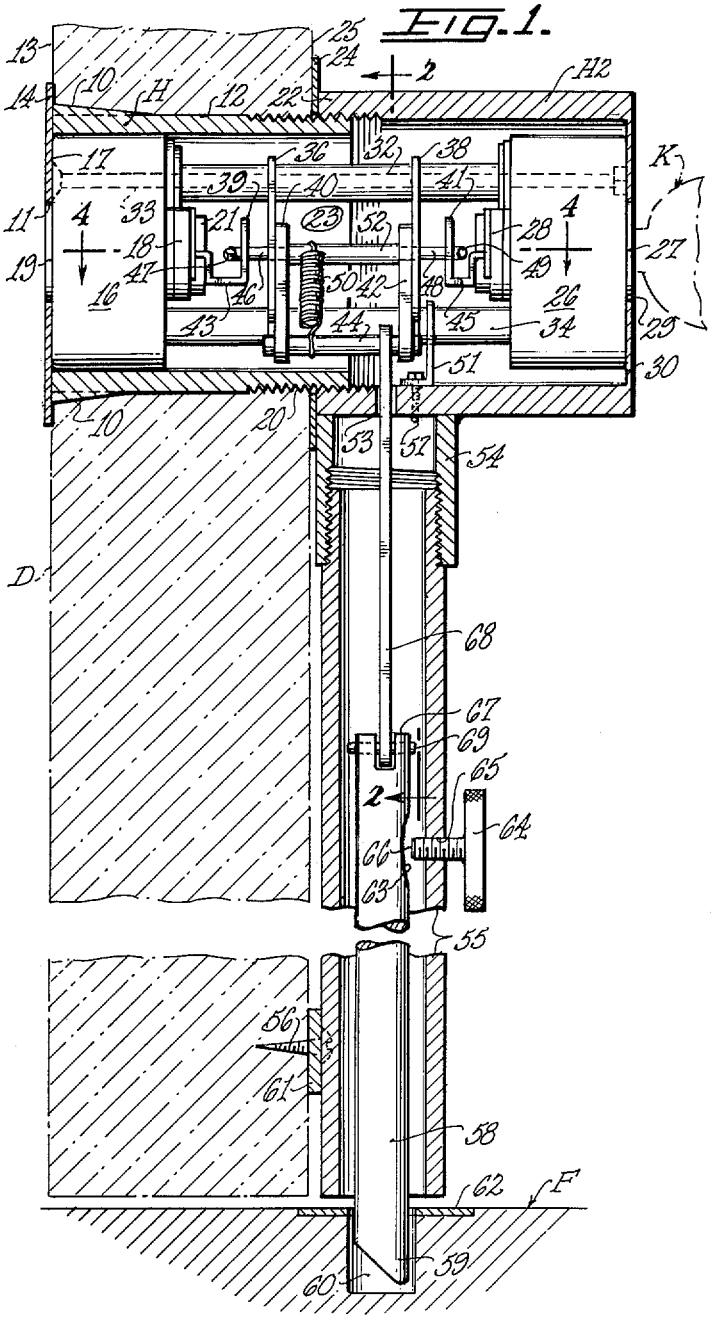
FIG. 2.
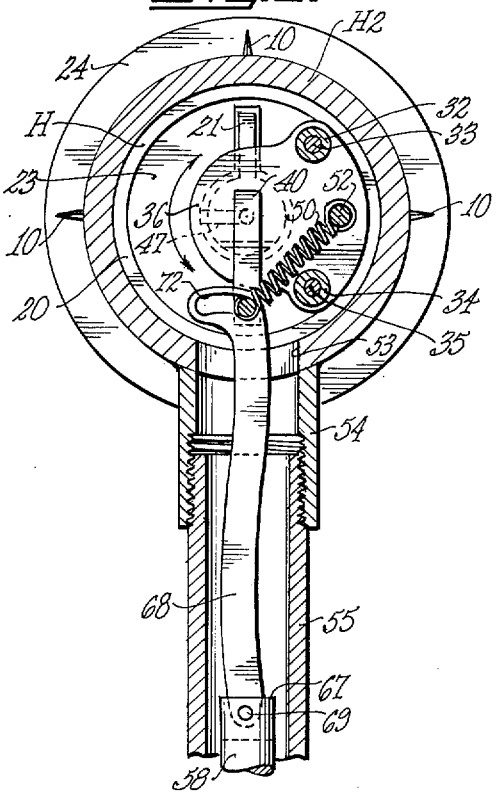
FIG. 3.
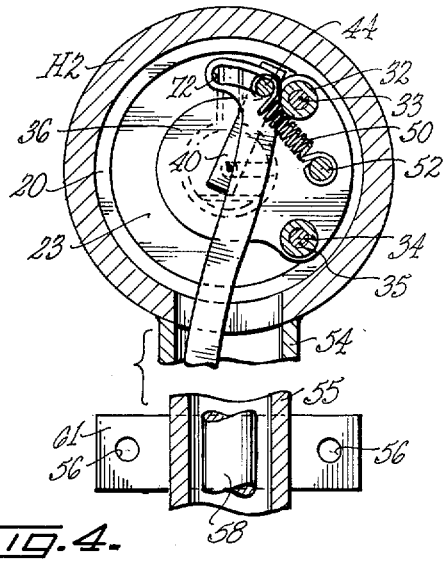
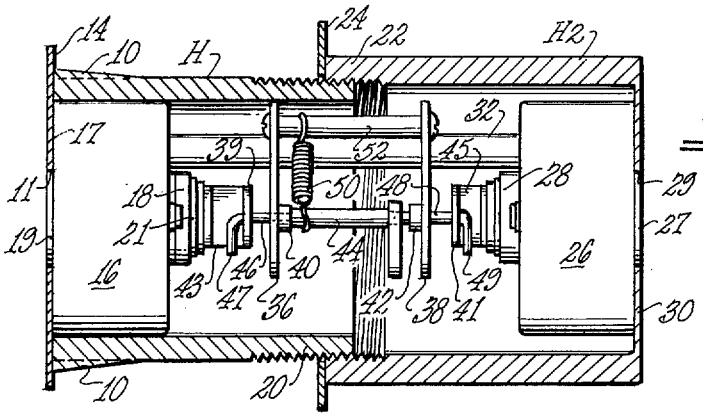
FIG. 4.

DOUBLE CYLINDER LOCK BOLT ASSEMBLY

Matter enclosed in heavy brackets [ ] appears in the original patent but forms no part of this reissue specification; matter printed in italics indicates the additions made by reissue.

This invention is shown in the Ser. No. 036,825 filed in the U.S. Pat. Office Nov. 18, 1974 by the present inventor.

BACKGROUND OF THE INVENTION

The ease with which ordinary door locks can be opened for unauthorized entry as by jimmying the latch, or by other manipulation such as by use of picks or simple instruments is well known. To combat this, a simple latch may be replaced or augmented with a deadbolt, and a single tumber may have its combination reproduced in a second tumbler installed on the inner side of the door, so that a key must be used to open the door from either side. However, a deadbolt operated by double cylinders currently has to be in horizontally longitudinal alignment with the lock assembly and thus makes the short projection from the nearest door edge (at door knob height) to the immediately adjacent door jamb socket. While this is better than a simple latch (operable from outside with a key), or a slide bolt (operable only from within), it would be still more desirable to extend a lock bolt to the upper and/or lower door jamb where it further braces the door against a burst-in and also sockets itself at a location less available for forceful manipulation from outside than at the door knob level. While something like this may be available as fire doors for warehouses and auditoriums, they are not generally key-operable from either side and are not otherwise suitable for a residence doorway. In particular, it would be desirable to have a top or bottom extending slide bolt lock tumbler construction which could be added to already existing or hanging residence doors.

SUMMARY OF THE INVENTION

There is provided a new and improved lock assembly which includes or associates floor- and/or ceiling-socketed lock bolts, which elongated sliding bolts can be added to the inner face of an existing door such as may be already hanging in an apartment or other residence, or alternately such slide bolts(s) can be factory-installed entirely within the body of newly fabricated doors. In either case, the slide bolts are operable by a vertically swinging sub-unit disposed along the main horizontal axis of the lock assembly and pivotally connected to the slide bolt from within a tubular casing, which casing houses the assembly and is mounted extending generally horizontally through the door panel from one side to the other. At each end of the casing is an operating cylinder, which may be either a key-operated pin tumbler of well known design or (as on the inner face of the door) it may be a knob-ended cylinder adapted entirely for manual turning. By turning either cylinder, the internally connected shift sub-unit is caused to swing a half turn (180°) so as to slide the lock bolt up or down to engage or disengage its distally aligned socket.

Current lock bolt constructions propel the short bolt along a horizontal channel perpendicular to the axis of the operating cylinders. In contrast, the present shift assembly or sub-unit rotates along a generally horizontal axis which is substantially parallel to or coaxial with the axis of the casing assembly. A half turn rotates it between alternate vertically-separated stop or limit positions. The unit is spring biased in both directions so as to cause it to complete the travel in whichever direction it has been given momentum (by initial turning of an operating cylinder), thus preventing the shift unit from coming to rest on dead center. In addition, provision is made against accidental or gravitational self-descent of a vertically disposed lock bolt such as might otherwise result from spring failure. This is done by positioning the upper "stop" position somewhat beyond the rotational apex or zenith of its arcuate path. Within the mounted housing or casing, the shift unit is located between the inner ends of the pair of axially separated operating cylinders. Its swing between alternate rest or limit positions, in response to rotation of *a coupling element by* either selected cylinder, is achieved by disposing its rotational swing axis along the common (horizontal) axis of the aligned cylinders[, with]. *The illustrated coupling element here comprises* a crank arm projecting from each end of the shift unit and extending transversely in the same direction along a radial plane, so that each, jointly, being fixed to the shift unit, will rotate with it and at the end of swing will each overlie one side or the other of a diametric contact surface which is carried by the adjacent, inner end of each operating cylinder. Rotation of a cylinder thus rotates the shift unit and its mutually parallel crank arms by contact with the particular arm which overlies the propelling half of the contact surface of the cylinder which is turned. However this does not cause the other cylinder to move at all, but the crank arm which overlies the contact surface of the latter cylinder is rotated (together with the shift unit) 180° so as then to abut the other half of the diametric contact surface. In practice, the contact surface (43, 45) may be displaced a small amount radially from the exact diametric position and the operating cylinder may then have to be rotated a little more than 180°, but the action of the shift unit with its pair of crank arms remains as just described. *Such half-turn lost-motion coupling elements are commonly used to allow a key tumbler to remain unmoved while the intermediate lock mechanism is operated by an opposing, coaxial cylinder. Similarly, in the present assembly, each key tumbler cylinder is connected to the shift unit by such coupling element (FIGS. 1 & 4).*

BRIEF DESCRIPTION OF THE DRAWINGS

FIG. 1 is a vertical sectional view through a door with the lock assembly installed therein, some parts appearing in elevation.

FIG. 2 is a transverse vertical section taken along the line 2—2 of FIG. 1 with the movable elements seen in locked position.

3. is a sectional view similar to FIG. 2 but with the movable elements shown in unlocked position.

FIG. 4 is a horizontal sectional view taken along the line 4—4 of FIG. 1.

DETAILED DESCRIPTION OF ILLUSTRATED EMBODIMENT

An outer housing tube or casing H having longitudinally directed anchorage splines 10 is mounted within an aperture 12 of a door D with its facing flange 14 disposed frictionally overlying the outer surface 13 of the door panel. The facing plate 15 of the housing has a central opening 11 which embraces or seats the terminal boss 19 of a tumbler cylinder 18 of conventional construction. The cylinder 18 is rotatably retained in a tumbler holder 16 in conjunction with a row of pin tumblers (not shown) contained in a radially directed housing 21. The holder 16 and its operating cylinder 18 are thus seated against the inner face 17 of the housing end plate of the casing H.

The inner projecting end of the casing H is externally threaded at 20 and is engaged by the internally threaded end 22 of a similar or inner housing tube H2, which threaded end in assembly is drawn tight against an abutment collar 24 which is placed so as to overlie the inner surface 25 of the door. In order to accommodate doors of different thickness, collars of different axial thickness may be provided. The inner housing tube H2 similarly contains a fixed tumbler holder 26 and a rotatable tumbler cylinder 28 with annular projecting end boss 27 disposed in an opening 29 of the end wall 30 of the housing. Each tumbler cylinder 18, 28 is intended to be operable with the same key K. That is, the door can be unlocked from either side if the same tumbler pattern or combination is used.

Within the central cavity 23 formed by the coupled housing tubes, the opposite tumbler holders 16, 26 are spaced apart by a pair of upper and lower spacing sleeves 32, 34 which are traversed by respective bolts 33, 35 which also go through the tumbler holders 16, 26. Spaced apart along the sleeves are a parallel pair of transverse bearing or anchorage plates 36, 38, diametrically disposed relative to the housing tubes H, H2.

The pair of anchorage plates jointly suspend a rocker or shift assembly which is formed by a pair of suspension arms 40, 42, which at their radially-outward ends are joined together by a throw-shaft 44. The inner end of each suspension arm is fixed to one end of a respective L-shaped crack arm or "turk" 46, 48 which latter pivotally traverse in turn the adjacent anchor plates, and a side wall 39, 41 of a tray or channel member 43, 45 with their transverse or radially directed arms 47, 49 disposed upon the respective channel surface (as seen particularly in FIG. 4). The longitudinally directed shafts 46, 48 are generally coaxial with the composite housing H, H2 and with the tumbler cylinders 18, 28. Each contact surface 43, 45 is diametrically fixed to the end of the adjacent tumbler cylinder 18 or 28 so as to be rotatable in unison therewith, for a half turn or a minimum distance of approximately 180° as indicated by the arrow in FIG. 2. Accordingly a half rotation of either (usually key-operated) cylinder 18, 28 will move the throw shaft 44 between the two extreme or limit positions shown respectively in FIGS. 2 and 3. To insure that the shaft 44 will not stall at an intermediate position, it is connected by a tension spring 50 to a cross pin 52 which is fixed between the anchor plates 36, 38 at a circumferential midposition (FIG. 2) between the two sleeves 32, 34. Thus when the shaft 44 is at its mid-throw position, the spring 50 is stretched the maximum and biased to bring the shaft to one stop position or the other according to the direction of momentum. A hanger fixture 51 peripherally embraces the sleeve 34 and at its base is secured to the casing H2 by a retainer 57 so as to anchor the interconnected elements against rotation as a unit within the casing which might otherwise accompany movement of the throw shaft 44.

The inner housing H2 is formed with a short, radially directed, dependent outlet or coupling tube 54, the interior of which is continuous with a transversely-elongated aperture 53 in the threaded side of the casing 22 so as in assembly to locate the side of the coupling tube 54 adjacent the abutment collar 24. A vertical pipe or guide tube 55 is threadedly attached to the outer or distal end of the coupling tube so as to place its lower end adjacent the floor F, being secured against the face of the door panel by attachment bracket 61 and fastening elements 56. Lengthwise displaceable within the channel of the guide tube 55 is an elongated slide bolt 58 having a distal end tongue 59 receivable in a wall socket 60 formed in the floor F (or ceiling) and overlaid by an apertured keeper plate 62.

Intermediate the length of the slide bolt is a lock element formed by a thumb screw 64 threadedly mounted in a tapped aperture 65 so that the blunt end 66 thereof can frictionally abut a planar lock surface 63 formed along the opposing bolt face and thus prevent its longitudinal displacement. That is, when the thumb screw 64 is set, the bolt 58 cannot be retracted by use of the key or operating cylinder 18, 28 from either side of the door.

The proximate end of the slide bolt is bifurcate 67 and is coupled to a longitudinally S-shaped and flat-sided link 68 by means of a transverse pivot pin 69 within the channel of the guide tube 55. The proximate end of the link is transversely flared and formed with an arcuate guide slot 72 through which is inserted the throw rod 44. Accordingly as the latter is moved a half turn vertically, (by action of the key turning either tumbler cylinder 18, 28), the slide bolt 58 is moved up or down by means of the link 68 causing its end 59 to withdraw or seat in the floor socket 60. When in its withdrawn position, as seen in FIG. 3, due to the action of the tension spring 50 applied to the end of the curved link 68, the throw rod 44 will be a little beyond its zenith position so that (in the event of failure of spring 50) the bolt and link could not gravitationally descend to locked position as might otherwise be caused by jarring of the door or frame.

I claim:

1. A lock assembly comprising in combination:

a pair of axially aligned, individually rotatable operating cylinders having means for selective anchorage spaced-apart opposite ends of a transverse bore of a closure, which closure carries a projectable lock bolt, [the adjacent inner ends of each cylinder carrying a generally diametricaly disposed contact surface projecting toward the adjacent spaced-apart cylinder and extending laterally to both sides of the common axis of said cylinders,]

arcuately reciprocable shift means for moving the lock bolt between alternate locked and unlocked positions, said means being located between the spaced-apart cylinders and having a coupling portion [arcuately] swingable [from a pivot point along] *in a direction transverse to* said common axis with the arcuate portion thereof disposed in operative connection with the lock bolt, intermediate activating means connecting the inner end of each operating cylinder to the adjacent shift means therebetween, said activating means comprising a pair of [crank members each secured to a respective end of said shift means at points coaxial with and adjacent to a respective cylinder, each crank member having an arm laterally extending to one side of the common axis and disposed to contactingly overlie the adjacent contact-surface and thus to be turned by rotation of said surface, thereby] *lost-motion coupling elements each connected at one of its ends, for rotary movement by the inner end of a respective operating cylinder, and at its other end to said shift means thus enabling* arcuately moving the shift means plus its connected lock bolt between locked and unlocked positions in response to rotation of either operating cylinder.

2. A lock assembly according to claim 1 wherein at least one of said operating cylinders is a key-operated pin tumbler.

3. A lock assembly according to claim 1 wherein each of said operating cylinders is a key-operated pin tumbler.

4. A lock assembly according to claim 1 in combination with a support frame and a closure functionally mounted therein, said closure functionally carrying the lock assembly and said frame carrying a *vertically directed,* bolt retention socket in which said lock bolt is lockingly receivable.

5. A lock assembly according to claim 4 wherein said bolt is slidingly disposed along a longitudinal guide channel formed along a face of said closure.

6. A lock assemby according to claim 1 which additionally includes resilient means adapted to effect completion of a cylinder-initiated rotation of said shift means to alternate rest positions corresponding to socketed and unsocketed positions of the connected bolt.

7. A lock assembly according to claim 1 wherein said shift means include a generally radially projecting arm distally pivotally supporting a link element which is terminally connected to said lock bolt.

8. A lock assembly according to claim 7 in combination with a support frame and a closure functionally mounted therein, said closure functionally carrying the lock assembly and the frame carrying a bolt retention socket in which said lock bolt is lockingly receivable, said bolt being slidingly disposed along a longitudinal guide channel formed along a face of said closure.

9. A lock assembly according to claim 8 wherein at least one of said operating cylinders is a key-operated pin tumbler.

10. In combination with a support frame and a closure functionally mounted therein:

a lock assembly comprising a tubular casing transversely mounted in said closure with one end of the casing disposed adjacent one face of the closure, the casing having a continuing tubular segment projecting axially outward from the opposite face of the closure with an end wall thereof forming the other end of the casing, guide means located along said opposite face of the closure and providing an elongated slide channel extending between an edge of the closure and said projecting segment, a longitudinally extensible bolt disposed along said channel with a distal end tongue projectable in locking position into a socket located in the support frame, a pair of axially aligned and spaced apart operating cylinders individually rotatably mounted within said casing adjacent respective end walls thereof, [each of said cylinders at its inner end carrying a transverse contact surface which extends generally diametrically on each side of the common axis of the cylinders,]

a pair of axially separated bearing members disposed within the casing along said common axis and located [adjacent] *between* the respective [contact surfaces] *operating cylinders,* shift means disposed within the casing between the separated bearing members by [a pair of] shaft [elements] *means* axially journalled in the respective bearing members, said shift means being connected to said extensible bolt transversely through said casing and said shift means being movable between alternate rest positions corresponding to socketed and unsocketed positions of the bolt locking tongue, and each end of said axial shaft [elements] *means* having [a transversely extending arm which is selectively engageable by a respective contact surface of] *a linkage element disposed for rotary driving engagement by* one of said rotatable cylinders, whereby rotation of either cylinder [and its contact surface] will move [the corresponding transverse arm and] said shift means to an alternate rest position.

*11. A combination according to claim 10 wherein said slide channel extends generally upright from a bottom edge of the support frame and carries a bolt-engagement element for selectively locking said bolt in socketed position.*

*12. A combination according to claim 10 which additionally includes resilient means adapted to effect completion of a cylinder-initiated rotation of said shift means to alternate rest positions corresponding to socketed and unsocketed positions of the connected bolt, and said socket in the support frame and said elongated slide channel are generally vertically aligned.*

*13. A combination according to claim 12 wherein at least one of said operating cylinders is a key-operated pin tumbler.*

*14. A lock assembly according to claim 1 wherein said pair of lost-motion linkage elements each comprise a crank member having one arm secured generally coaxially to the inner end of one operating cylinder and its other arm extending laterally therefrom and disposed to drivingly contact the arcuately swingable portion of said shift means.*

* * * * *